US008849734B2

(12) United States Patent
Fredericksen et al.

(10) Patent No.: US 8,849,734 B2
(45) Date of Patent: Sep. 30, 2014

(54) SYSTEM, METHOD, AND COMPUTER PROGRAM PRODUCT FOR UPDATING AN ALGORITHM

(75) Inventors: Robin Eric Fredericksen, Trabuco Canyon, CA (US); Robin Malcolm Keir, Mission Viejo, CA (US)

(73) Assignee: McAfee Inc., Santa Clara, CA (US)

( * ) Notice: Subject to any disclaimer, the term of this patent is extended or adjusted under 35 U.S.C. 154(b) by 463 days.

(21) Appl. No.: 12/826,606

(22) Filed: Jun. 29, 2010

(65) Prior Publication Data

US 2013/0246320 A1    Sep. 19, 2013

(51) Int. Cl.
*G06F 15/18*    (2006.01)
*G06N 99/00*    (2010.01)

(52) U.S. Cl.
CPC .................................. *G06N 99/005* (2013.01)
USPC .......................................................... 706/14

(58) Field of Classification Search
None
See application file for complete search history.

(56) References Cited

U.S. PATENT DOCUMENTS

| 5,987,610 | A  | 11/1999 | Franczek et al. |
| 6,073,142 | A  | 6/2000  | Geiger et al. |
| 6,460,050 | B1 | 10/2002 | Pace et al. |
| 7,506,155 | B1 | 3/2009  | Stewart et al. |
| 7,519,954 | B1* | 4/2009 | Beddoe et al. ............... 717/124 |
| 2008/0244070 | A1* | 10/2008 | Kita et al. ...................... 709/225 |
| 2010/0031358 | A1* | 2/2010 | Elovici et al. ................... 726/24 |

OTHER PUBLICATIONS

Gary et al., "Personalised, Collaborative Spam Filtering", 2004, Proc. of 1st Conference on Email and Anti-Spam, www.ceas.cc/papers-2004/132.pdf, pp. 1-8.*
Garg et al., "May I Borrow Your Filter?" Exchanging Filters to Combat Spam in a Community, 2006, Proceedgins of the 20th International Conference on Advanced Information Networking and Applications (AINA), pp. 1-5.*
Li et al., "Efficient Application Identification and the Temporal and Spatial Stability of Classification Schema", Dec. 11, 2009, Computer Networks, 53, pp. 790-809.*
Skaggs et al., "Network Vulnerability Analysis", 2002, IEEE, pp. 493-495.*
Julius Schwartzenberg, "Using Machine Learning Techniques for Advanced Passive Operating System Fingerprinting", Aug. 12, 2010, pp. 1-89.*
Insecure.org (http://nmap.org/book/osdetect-unidentified.html), "Dealing with Misidentified and Unidentified Hosts", May 2008, pp. 1-2.*

* cited by examiner

*Primary Examiner* — Jeffrey A Gaffin
*Assistant Examiner* — Paulinho E Smith
(74) *Attorney, Agent, or Firm* — Patent Capital Group

(57) ABSTRACT

A system, method, and computer program product are provided for updating an algorithm. In use, feedback data associated with an identification of an object is received. Additionally, one or more algorithms are updated, based on the feedback data. Further, the updated algorithms are distributed.

18 Claims, 4 Drawing Sheets

SYSTEM, METHOD, AND COMPUTER PROGRAM PRODUCT FOR UPDATING AN ALGORITHM

FIELD OF THE INVENTION

The present invention relates to algorithms, and more particularly to algorithm updating.

BACKGROUND

Due to the widespread use of computer systems, security of such systems has become increasingly important. An assessment of a security posture of such systems may require a detection and identification of one or more objects of interest within an environment of the systems. For example, a unique identification of these objects utilizing one or more algorithms may be crucial to maintaining the security of the systems in their environment.

However, it has traditionally been difficult to perform this identification. For example, lack of credentials, a customer desire to 're-label' one or more objects of interest for internal reporting, and limitation of available identification information in customer-environment configurations all may make identification problematic. Additionally, algorithms used to perform the identification have traditionally exhibited several limitations. For example, such algorithms have traditionally been statically configured.

There is thus a need for overcoming these and/or other issues associated with the prior art.

SUMMARY

A system, method, and computer program product are provided for updating an algorithm. In use, feedback data associated with an identification of an object is received. Additionally, one or more algorithms are updated, based on the feedback data. Further, the updated algorithms are distributed.

DETAILED DESCRIPTION

Figure 1:
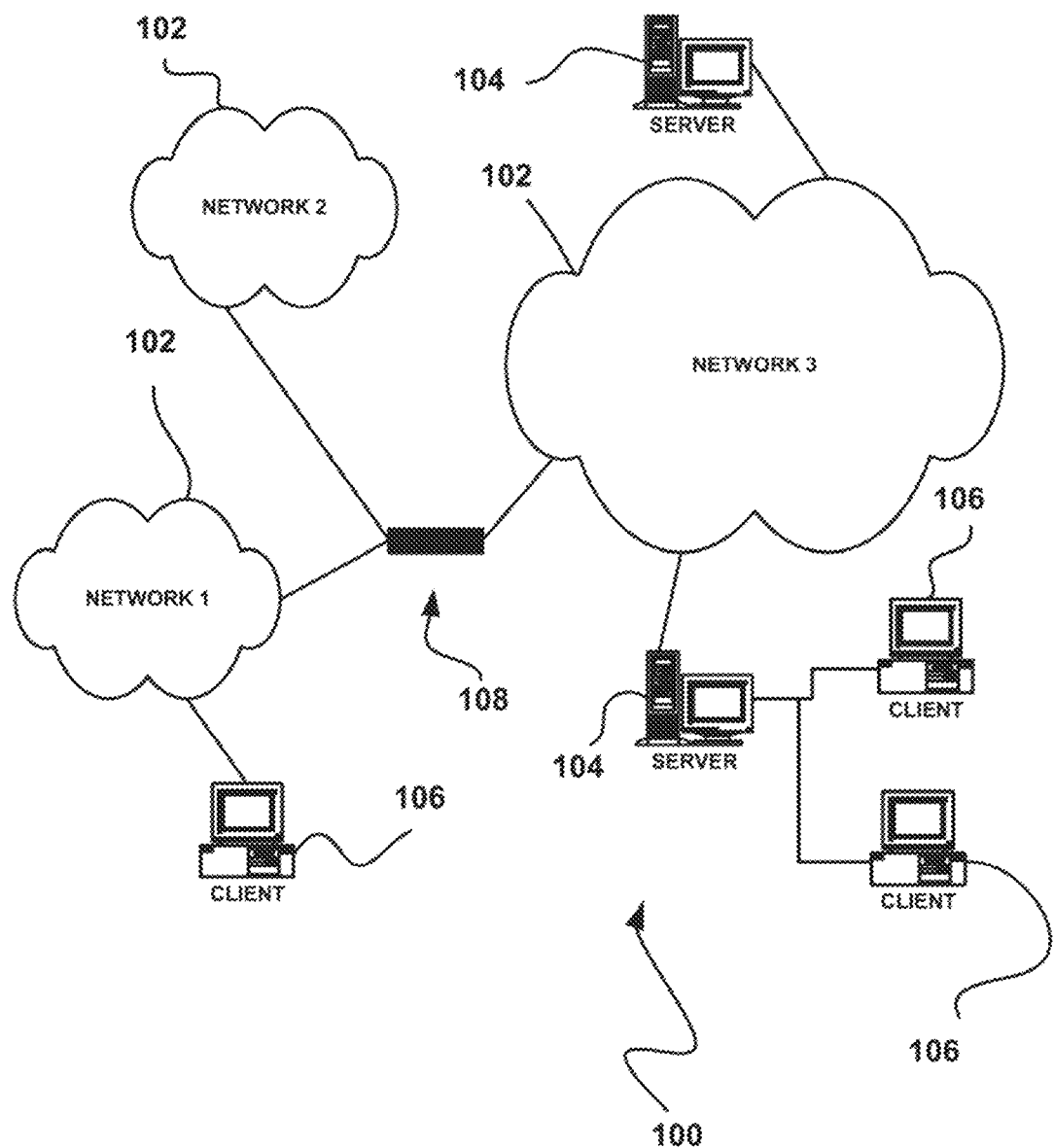
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
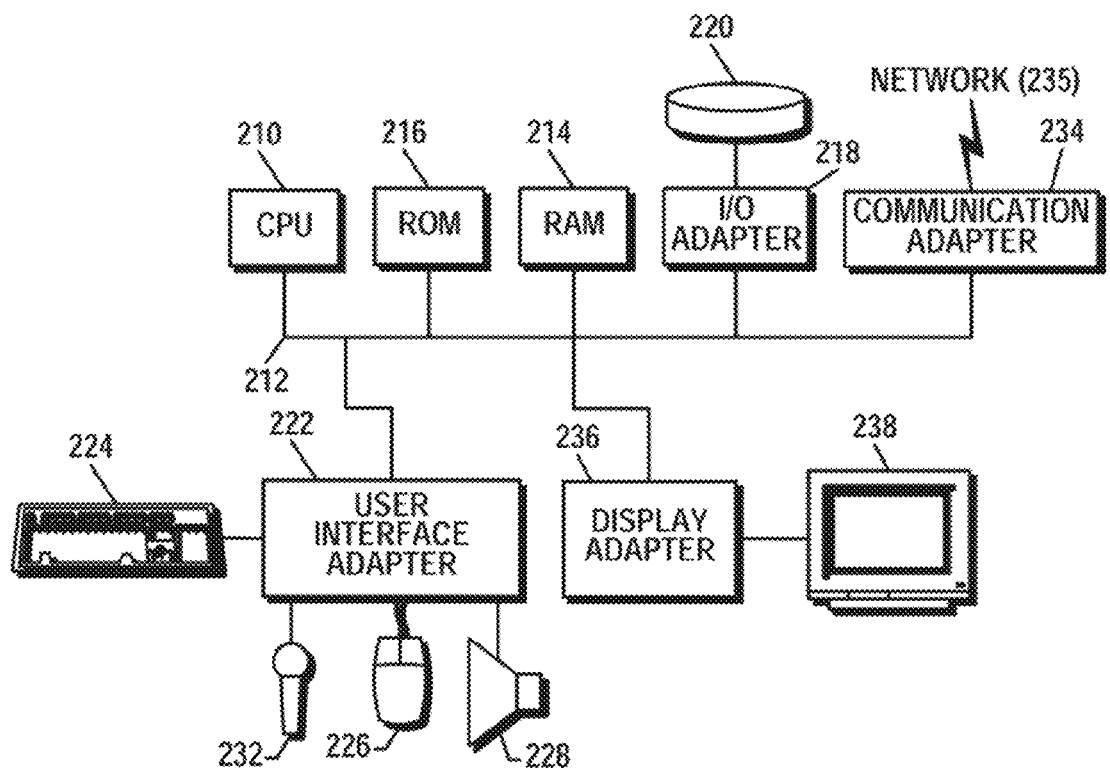
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
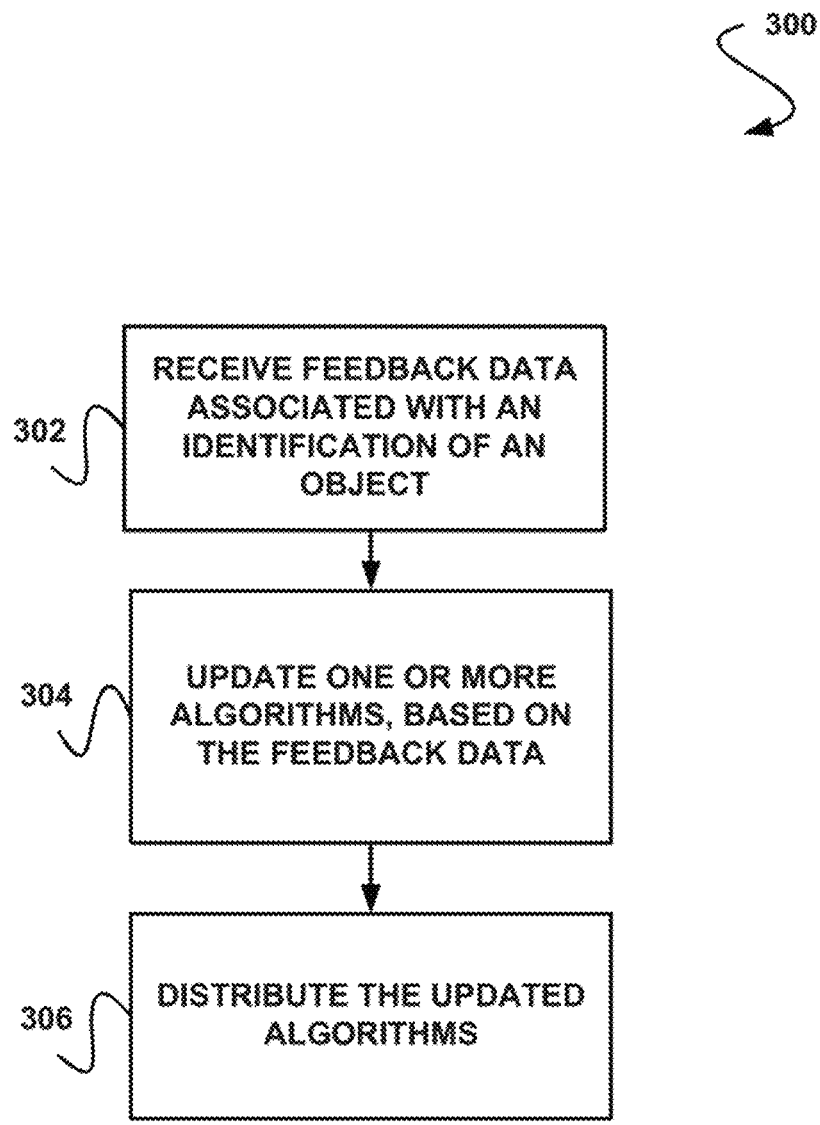
FIG. 3 shows a method for updating an algorithm in accordance with one embodiment.

FIG. 3 shows a method 300 for updating an algorithm in accordance with one embodiment. As an option, the method 300 may be implemented in the context of the architecture and environment of FIGS. 1 and/or 2. Of course, however, the method 300 may be carried out in any desired environment.

As shown in operation 302, feedback data associated with an identification of an object is received. In the context of the present description, the object may include any entity capable of being identified. In one example, the object may include an operating system of a computer. In another embodiment, the object may include a computer system as a whole (e.g., an IP-enabled computer system, server, network infrastructure, etc.). Further, in one embodiment, the object may include an application such as a web application or a database application, a database brand and/or vendor, a software application spanning multiple systems (e.g., the accounting systems across North America, etc.), etc. In another embodiment, the object may be unknown. In still yet another embodiment, the object may be associated with the security of an entity. For example, the object may include a security object.

Further still, the object may be identified for purposes of assessment. Additionally, the object may be identified for purposes of inventory. Of course, however, the object may be identified for any purpose.

Also, the identification of the object may include collecting one or more facts. For example, the feedback data may include one or more facts that have been collected that are associated with the object. Additionally, the identification of the object may include attempting to identify the object, utilizing one or more facts. For example, the feedback data may include one or more algorithms that are used to attempt to identify the object, utilizing the one or more facts.

Further, the identification of the object may include collecting one or more verified data elements. For example, the feedback data may include one or more verified data elements (e.g., "truths," etc.) that have been collected that are associated with the object. In one embodiment, the one or more verified data elements may include data defined by a customer, data defined by credentialed access, etc. Further still, the identification of the object may include determining an identifier for the object. For example, the feedback data may include an identifier of the object that is determined by the one or more algorithms.

Additionally, in the context of the present description, the feedback data may include any data that is received as feedback. Further, the feedback data may be received from one or more sources. For example, the feedback data may be received from a user system. In another example, the feedback data may be received from an intermediary. Of course, however, the feedback data may be received from any source.

Further still, in one embodiment, the feedback data may be received at a server, at a client, etc. For example, the feedback data may be received at an analysis center. Of course, the feedback data may be received at any destination. In another embodiment, the feedback data may be anonymized (e.g., made anonymous, etc.). In yet another embodiment, the feedback data may be received automatically. Further, in another embodiment, the feedback data may be received according to a schedule.

In addition, as shown in operation 304, one or more algorithms are updated, based on the feedback data. In one embodiment, the one or more algorithms may include an identification algorithm, a classification algorithm, etc. For example, the one or more algorithms may include an algorithm used in the identification of the object. In one embodiment, the one or more algorithms may include a decision tree algorithm (e.g., a random forest decision tree algorithm, etc.). In another embodiment, the one or more algorithms may include a Bayesian network algorithm. In yet another embodiment, the one or more algorithms may include a rule-based algorithm.

In still another embodiment, the one or more algorithms may include a linear classifier. For example, the one or more algorithms may include a Fisher's linear discriminant classifier, a logistic regression classifier, a Naïve Bayes classifier, a Perceptron classifier, a support vector machine, etc. Additionally, in one embodiment, the one or more algorithms may include a quadratic classifier. For example, the one or more algorithms may include a k-nearest neighbor classifier. Further, in one embodiment, the one or more algorithms may include a boosting classifier, a neural network, a hidden Markov model, etc. Of course, however, the one or more algorithms may include any type of classifier.

In one embodiment, the one or more algorithms may be updated by creating one or more new algorithms. For example, a data set may be updated utilizing the feedback data, and one or more new algorithms may be defined using the updated data set. In another embodiment, the one or more algorithms may be updated by refining the one or more algorithms utilizing the feedback data. In yet another embodiment, the one or more algorithms may be updated by training or retraining the algorithms using the feedback data.

Further, as shown in operation 306, the updated algorithms are distributed. In one embodiment, the updated algorithms may be distributed to one or more users. For example, the updated algorithms may be sent to all customers of a particular service. In another embodiment, the updated algorithms may be distributed in order to replace one or more existing algorithms. For example, the updated algorithms may replace one or more old algorithms at a user system.

In this way, all users of the one or more algorithms may benefit from algorithms that have been updated based on the feedback data. Further, the updating may be automated and dynamic, and may thereby allow the extension, addition, and modification of existing algorithms, thereby optimizing reconciliation, sharing of security information, remediation, prioritization, and protection of objects.

Additionally, the one or more updated algorithms may be more efficient, effective, accurate, etc. For example, if the one or more updated algorithms include an identification algorithm, such identification algorithm may more accurately and confidently identify one or more objects, which may improve assessment, remediation, and risk analysis, as well as work prioritization and referencing the same object across products and/or components. Additionally, human intervention may be avoided when updating algorithms.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
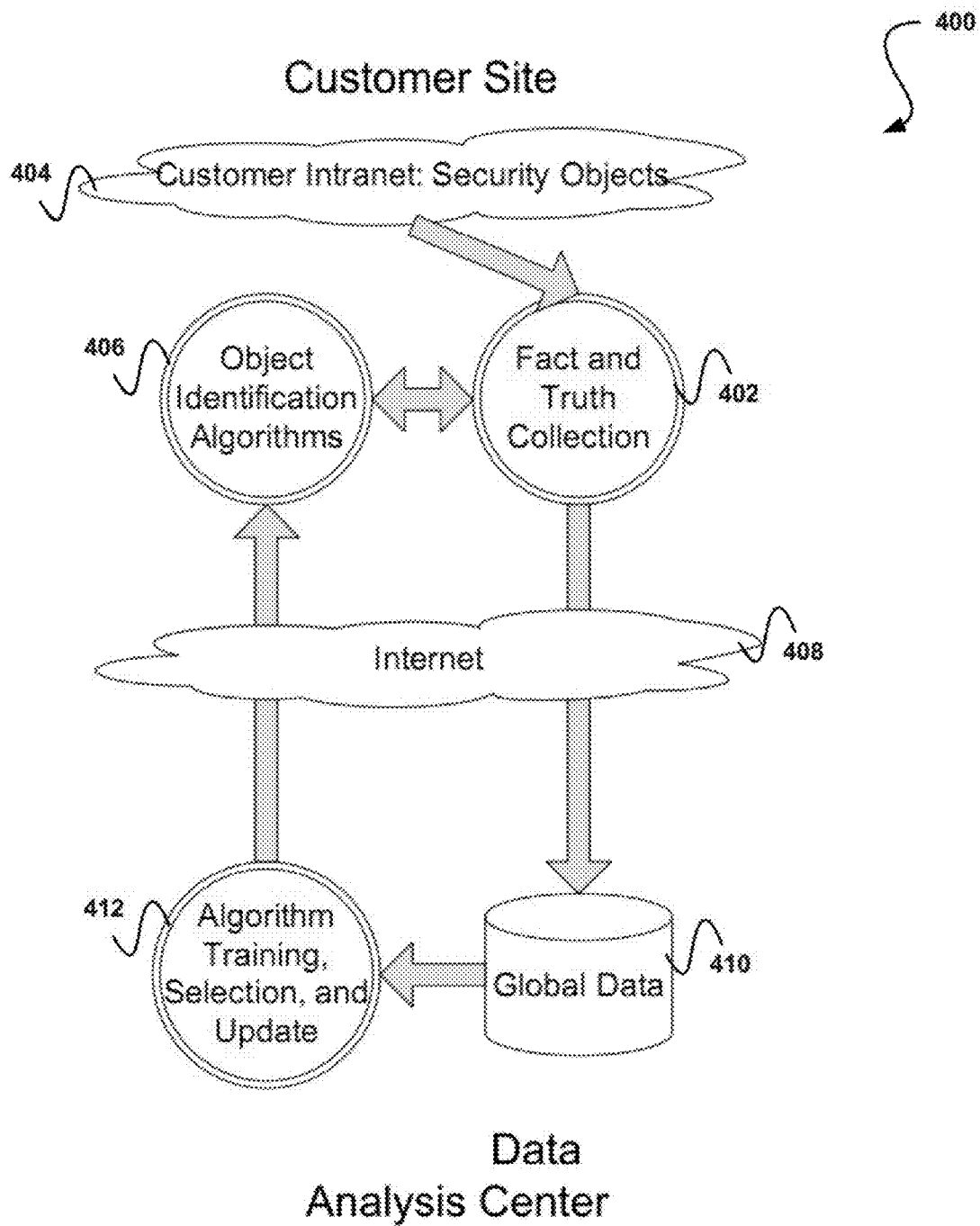
FIG. 4 shows a system for updating an algorithm, in accordance with another embodiment.

FIG. 4 shows a system 400 for updating an algorithm, in accordance with another embodiment. As an option, the system 400 may be implemented in the context of the architecture and environment of FIGS. 1-3. Of course, however, the system 400 may be carried out in any desired environment. It should also be noted that the aforementioned definitions may apply during the present description.

As shown, the system 400 includes a fact and truth collection module 402. In the context of the present embodiment, the fact and truth collection module 402 may include one or more entities that collect one or more facts and/or truths associated with an object. For example, the fact and truth collection module 402 may include a vulnerability manager within a customer intranet 404. In one embodiment, the fact and truth collection module 402 may collect facts associated with a computer operating system from inside the customer intranet 404. For example, the fact and truth collection module 402 may gather facts such as transmission control protocol (TCP) stack fingerprints, IP stack fingerprints, open ports, TCP service banners, available services, instances of a particular element, and/or other text or binary information associated with the computer operating system.

In one embodiment, particular facts and/or truths may be associated with a particular object. In another embodiment, the number and/or type of facts and/or truths associated with a particular object may change over time (e.g., as one or more of the object identification algorithms 406 is improved, new algorithms are added, etc.).

In another embodiment, the fact and truth collection module 402 may collect truths associated with a computer operating system. For example, the fact and truth collection module 402 may collect truths such as a previous identification (e.g. name, etc.) of an operating system. In one embodiment, the previous identification of the operating system may be collected from the customer intranet 404, from a remote database, from the object identification algorithms 406, or from any other source. It should be noted that the facts and the truths may be gathered by the fact and truth collection module 402 from different sources on the customer intranet 404.

Additionally, the system 400 includes object identification algorithms 406 (e.g. which may be located in the customer intranet 404 in conjunction with the fact and truth collection module 402). In the context of the present embodiment, the object identification algorithms 406 may include any algorithm that attempts to identify one or more objects based on facts and truths received from the fact and truth collection module 402. In one embodiment, the object identification algorithms 406 may receive one or more facts and/or truths from collection module 402.

Additionally, the object identification algorithms 406 may attempt to identify one or more objects inside the customer intranet 404, based on the received facts and/or truths. For example, the object identification algorithms 406 may attempt to identify an operating system inside the customer intranet 404 by vendor, service pack, or other identifying characteristic based on the received facts and/or truths. In another example, the object identification algorithms 406 may generate a similarity percentage, a confidence percentage, etc.

In one embodiment, the object identification algorithms 406 may attempt to identify one or more objects utilizing one or more techniques found in U.S. Pat. No. 7,519,954, filed Apr. 14, 2009, which is incorporated herein by reference in its entirety for all purposes. Of course, however, the object identification maybe performed in any manner.

In another embodiment, the object identification algorithms 406 may output an identification of an object within the customer intranet 404. For example, the object identification algorithms 406 may determine an identification of an operating system inside the customer intranet 404, and may send that identification (e.g., as a truth, etc.) to the fact and truth collection module 402. Additionally, the identification of the object may be associated with one or more facts and/or truths.

For example, when the fact and truth collection module 402 receives the identification of the operating system inside the customer intranet 404, it may associate the identification with the particular facts and/or truths used by the object identification algorithms 406 to perform the identification. In one embodiment, the object identification algorithms 406 may notify the fact and truth collection module 402 of these associated facts and/or truths. In another embodiment, the fact and truth collection module 402 may determine these associated facts and/or truths (e.g., based on facts and/or truths previously sent to the object identification algorithms 406, etc.).

In yet another embodiment, a customer-specific phase may create customer-specific subgroups of identifications of the object by the object identification algorithms 406. Additionally, customer specific object label overrides may be applied to default labels applied during the identification process by the object identification algorithms 406. In this way, the identification results of the object identification algorithms 406 may be customized to a particular customer.

Further, the system 400 includes a global data repository 410. In one embodiment, the fact and truth collection module 402 may send one or more gathered facts and/or truths to the global data repository 410 via the Internet 408. For example, facts and/or truths associated with a computer operating system that are gathered by the fact and truth collection module 402 from inside a customer intranet 404 may be anonymized and returned to the global data repository 410 at a data analysis center.

In one embodiment, facts and/or truths may be sent to the global data repository 410 as they are detected by the fact and truth collection module 402. In another embodiment, facts and/or truths may be locally stored temporarily by the fact and truth collection module 402 as they are detected, and may be sent to the global data repository 410 according to a schedule.

Of course, however, the facts and/or truths may be sent to the global data repository 410 by the fact and truth collection module 402 in any manner.

Further still, the system 400 includes an algorithm training, selection, and update module 412. In the context of the present embodiment, the algorithm training, selection, and update module 412 may include one or more entities that train, select, and update one or more algorithms. In one embodiment, the algorithm training, selection, and update module 412 may use one or more facts and/or truths received from the global data repository 410. For example, one or more of the object identification algorithms 406 that are used to identify an operating system inside the customer intranet 404 may need to be trained by the algorithm training, selection, and update module 412 using one or more of a set of facts and/or truths associated with operating systems from the global data repository 410.

In one embodiment, when the global data repository 410 receives one or more gathered facts and/or truths from the fact and truth collection module 402, the global data repository 410 may forward these gathered facts and/or truths to the algorithm training, selection, and update module 412, along with an indication of one or more algorithms that are to be trained using such gathered facts and/or truths. In response, the algorithm training, selection, and update module 412 may select one or more algorithms and train them using data including the gathered facts and/or truths.

In yet another embodiment, the algorithm training, selection, and update module 412 may create a new algorithm. For example, the algorithm training, selection, and update module 412 may create a new algorithm based on data in the global data repository 410, including one or more gathered facts and/or truths from the fact and truth collection module 402.

Additionally, the algorithm training, selection, and update module 412 may then send the newly trained algorithms to the object identification algorithms 406 via the Internet 408. In one embodiment, the newly trained algorithms may replace one or more of the preexisting object identification algorithms 406. In this way, updated and revised algorithms may be sent to the customer site for future use. Additionally, as customers add new systems (and therefore new objects), the object identification algorithms may automatically be revised to correctly and accurately identify the new objects in all customer environments, even though a single customer may not have all variations of all identifiable objects installed.

In another embodiment, if the object identification algorithms 406 are unable to accurately identify an object for a particular user, the identification may be delayed until a relevant identification algorithm is updated. In this way, the updated identification algorithm may identify the object more accurately and efficiently based on data from identifications performed by other users.

Additionally, the object identification algorithms 406 may become more accurate as a result of the updating and revising. For example, the object identification algorithms 406 may include a random forest decision tree, and such random forest decision tree may become more accurate and comprehensive as a result of the algorithm training, selection, and update module 412 generating a broader ensemble of trees within the random forest decision tree encompassing all known configurations based on newly gathered facts and/or truths.

In one embodiment, the fact and truth collection module 402 may collect stack fingerprinting, credential access, and other data from a customer in the customer intranet 404. Additionally, the fact and truth collection module 402 may send the collected data to an operating system (OS) identification algorithm of the object identification algorithms 406 for the customer. The OS identification algorithm may then be applied to the collected data to produce an identification of an OS of the customer. Further, such identification may be sent to the fact and truth collection module 402, which may then send the identification as well as the collected data to the global data repository 410.

Further still, the global data repository 410 may then send the identification and the collected data to the algorithm training, selection, and update module 412. The algorithm training, selection, and update module 412 may then update the OS identification algorithm, utilizing the identification and the collected data. Also, after the OS identification algorithm has been updated, the algorithm training, selection, and update module 412 may then update the object identification algorithms 406 of all customers with the updated OS identification algorithm.

In this way, the OS identification algorithm of all customers may be updated based on the identification results of the OS identification algorithm at a single customer location. Additionally, if an incorrect OS identification exists at an individual location in the system 400, and correct OS identifications exist at other locations in the system 400, the incorrect identification may be better identified based on feedback reported from the correct OS identifications received at the global data repository 410 from the fact and truth collection module 402.

Additionally, customer satisfaction may increase, thereby resulting in increased renewal rates for one or more services utilizing the system 400. Further, full integration and interactivity of the system 400 may be achieved, and unknown objects may be correctly and efficiently identified, thereby enabling optimal operation of associated services (e.g., integrated security suite, etc.).

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A tangible non-transitory computer readable medium for revising one or more object identification algorithms, comprising:
   computer code for receiving, at a global data repository via the Internet from a fact and truth collection module, feedback data associated with an identification of an object of a user system operating as part of an Intranet that includes a plurality of user systems, wherein said object includes one of: an operating system, a computer system, and an application, and the feedback data is anonymized before being provided to the global data repository;
   computer code for updating the one or more object identification algorithms for identifying an operating system inside the Intranet by training the one or more object identification algorithms based on the feedback data; and
   computer code for distributing the one or more updated object identification algorithms to the plurality of user systems;
   wherein one user system in the Intranet delays identifying the object and waits for the one or more updated object identification algorithms if the one user system fails to identify the object.

2. The non-transitory computer readable medium of claim 1, wherein the feedback data includes one or more facts that have been collected that are associated with the object.

3. The non-transitory computer readable medium of claim 1, wherein the feedback data includes one or more algorithms that are used to attempt to identify the object, utilizing the one or more facts.

4. The non-transitory computer readable medium of claim 1, wherein the feedback data includes one or more verified data elements.

5. The non-transitory computer readable medium of claim 1, wherein the feedback data includes an identifier of the object that is determined by the one or more object identification algorithms.

6. The non-transitory computer readable medium of claim 1, wherein the computer program product is operable such that the feedback data is received automatically.

7. The non-transitory computer readable medium of claim 1, wherein the one or more algorithms are updated by creating one or more new object identification algorithms and the one or more new object identification algorithms are distributed to the user systems as the one or more updated object identification algorithms.

8. The non-transitory computer readable medium of claim 1, wherein the one or more object identification algorithms are updated by refining the one or more object identification algorithms.

9. The non-transitory computer readable medium of claim 1, wherein the computer program product is operable such that the updated object identification algorithms replace one or more old object identification algorithms at a user system.

10. The non-transitory computer readable medium of claim 1, wherein the one or more object identification algorithms include a linear classifier.

11. The non-transitory computer readable medium of claim 1, wherein the computer program product is operable such that a data set is updated utilizing the feedback data, and one or more new object identification algorithms are defined using the updated data set.

12. The non-transitory computer readable medium of claim 1, wherein the one or more object identification algorithms include a decision tree algorithm.

13. The non-transitory computer readable medium of claim 1, wherein the one or more object identification algorithms include a Bayesian network algorithm.

14. The non-transitory computer readable medium of claim 12, wherein the computer program product is operable such that the one or more updated object identification algorithms are sent to all customers of a particular service.

15. A method for revising one or more object identification algorithms, comprising:
   receiving, at a global data repository via the Internet from a fact and truth collection module, feedback data associated with an identification of an object of a user system operating as part of an Intranet that includes a plurality of user systems, wherein said object includes one of: an operating system, a computer system, or an application, and the feedback data is anonymized before being provided to the global data repository;
   updating the one or more object identification algorithms for identifying an operating system inside the Intranet by training the one or more object identification algorithms based on the feedback data; and distributing the one or more updated algorithms to the plurality of user systems;

wherein one user system in the Intranet delays identifying the object and waits for the one or more updated object identification algorithms if the one user system fails to identify the object.

16. A system for revising one or more object identification algorithms, comprising:

a processor configured for:

receiving, at a global data repository via the Internet from a fact and truth collection module, feedback data associated with an identification of an object of a user system operating as part of an Intranet that includes a plurality of user systems, wherein said object includes one of: an operating system, a computer system, and an application, and the feedback data is anonymized before being provided to the global data repository, updating the one or more object identification algorithms for identifying an operating system inside the Intranet by training the one or more object identification algorithms based on the feedback data, and distributing the one or more updated algorithms to the plurality of user systems;

wherein one user system in the Intranet delays identifying the object and waits for the one or more updated object identification algorithms if the one user system fails to identify the object.

17. The system of claim 16, wherein the processor is coupled to memory via a bus.

18. The non-transitory computer readable medium of claim 1, wherein:

the object is an operating system operating inside the Intranet;

the feedback data comprises at least one of: transmission control protocol (TCP) stack fingerprints, Internet Protocol (IP) stack fingerprints, open ports, TCP service banners, available services, credential access and an identification of the operating system based on any of the above using the object identification algorithm of the one or more algorithms.

* * * * *